United States Patent [19]

Driscoll et al.

[11] 4,447,493

[45] May 8, 1984

[54] VIBRATION-DAMPING CONSTRAINED-LAYER CONSTRUCTIONS

[75] Inventors: William A. Driscoll, Woodbury; Steven M. Heilmann, North St. Paul; Jerald K. Rasmussen, Stillwater, all of Minn.

[73] Assignee: Minnesota Mining and Manufacturing Company, St. Paul, Minn.

[21] Appl. No.: 401,918

[22] Filed: Jul. 26, 1982

[51] Int. Cl.$^3$ .................. B32B 15/08; B32B 27/38
[52] U.S. Cl. ............................ 428/332; 428/412; 428/424.6; 428/424.8; 428/415; 428/416; 428/430; 428/431; 428/442; 428/458; 428/463; 428/522; 428/435; 428/447; 428/448; 428/516; 428/517; 428/518; 428/476.9; 428/483; 428/422; 427/385.5; 427/388.2; 427/388.4; 427/389.8; 156/329; 156/330; 156/331.4; 156/331.8; 123/195 C; 123/198 E; 181/204; 181/210; 360/129; 29/156.4 R
[58] Field of Search ............ 428/332, 522, 430, 435, 428/431, 442, 458, 463, 447, 518, 520, 516, 517, 422, 476.9, 483; 427/388.2, 385.5, 388.4; 156/329, 330, 331.4, 331.8

[56] References Cited

U.S. PATENT DOCUMENTS

| | | | |
|---|---|---|---|
| 3,640,836 | 2/1972 | Oberst et al. | 181/33 X |
| 3,847,726 | 11/1974 | Becker et al. | 156/330 X |
| 3,941,640 | 3/1976 | Farnam et al. | 156/252 |
| 4,045,416 | 8/1977 | Robson et al. | 428/463 X |
| 4,048,366 | 9/1977 | Kingsbury | 428/215 |
| 4,098,951 | 7/1978 | Wolff | 428/463 |
| 4,223,073 | 9/1980 | Caldwell | 428/422 |
| 4,304,705 | 12/1981 | Heilmann et al. | 428/441 X |

OTHER PUBLICATIONS

Nielsen, L. E., "Mechanical Properties of Polymers", 1965, pp. 162–165.
Rosen, S. L., "Fundamental Principles of Polymeric Materials for Practicing Engineers", 1971, pp. 222–227.
Bolz, R. E., Ed., et al., 1974, "Handbook of Tables for Applied Engineering Science", p. 130.
Yerges, L. F., "Sound, Noise & Vibration Control", 1969, pp. 68–69.

*Primary Examiner*—P. Ives
*Attorney, Agent, or Firm*—Donald M. Sell; James A. Smith; Lorraine R. Sherman

[57] ABSTRACT

A constrained-layer construction comprising a stiff layer or substrate and a layer of a viscoelastic polymer which is the reaction product of (a) 25 to 75 weight percent of an acryloyl or methacryloyl derivative of at least one oligomer, said oligomer having a glass transition temperature of less than 25° C. and a molecular weight per oligomer of 600 to 20,000, and (b) 75 to 25 weight percent of a copolymerizable monomer whose homopolymer has a glass transition temperature of at least 50° C., the copolymer being suitable for damping vibrations at relatively high temperatures, e.g., 50°–150° C., is disclosed. Also included is a process for damping vibrations in component parts of devices used in automotive, aerospace, and computer industries.

8 Claims, No Drawings

VIBRATION-DAMPING CONSTRAINED-LAYER CONSTRUCTIONS

DESCRIPTION

1. Technical Field

This invention relates to a constrained-layer construction comprising a stiff layer or substrate and a layer of viscoelastic polymer that is useful to dissipate or damp the destructive and undesirable aspects of vibration. In another aspect, it relates to a process for using a vibration-damping constained-layer construction in high temperature applications.

2. Background Art

It has long been known that the vibration of component parts of devices and structures that vibrate under the influence of an applied internal or external force can be substantially reduced by the attachment of a layer of viscoelastic material. It is particularly useful to provide a laminate of one or more metal sheets and one or more layers of viscoelastic materials (i.e., a constrained-layer construction) to the component part. A large number of viscoelastic materials have been suggested for this purpose. For example, U.S. Pat. No. 3,640,836 discloses a vibration-damping laminate in which the viscoelastic layer is a polymer comprised of ethylene, vinyl acetate and acrylic and/or methacrylic acid. U.S. Pat. No. 3,847,726 discloses a viscoelastic adhesive composition of a polyepoxide, a polyether amine, a heterocyclic amine, and a phenol useful as vibration-damping material over a $-25$ to $+60°$ C. range. Such compositions, however, are not effective for vibration-damping over prolonged periods of time at elevated temperatures.

U.S. Pat. No. 3,941,640 discloses a high temperature operational gasket of asbestos containing a minimum amount of binder that also serves as a vibration-damper. A laminate of asbestos-reinforced bitumen and a metal layer is taught as being especially suitable for noise reduction of internal combustion engine casing parts in U.S. Pat. No. 4,048,366. Such vibration-damping materials containing asbestos, a known carcinogen, are undesirable, however.

U.S. Pat. No. 4,223,073 discloses a vibration-damping composite containing a viscoelastic cyanurate polymer. Although high temperature vibration-damping is taught by the use of these composites, the process for their production is tedious, requiring curing temperatures up to 200° C. for several hours, and utilizes sulfuric acid or another strong acid as a catalyst (see U.S. Pat. No. 3,803,088, col. 4, lines 9-15) which can cause undesirable side reactions.

DISCLOSURE OF THE INVENTION

The present invention provides a vibration-damping constrained-layer construction which is a laminate of one or more stiff layers or substrates and one or more layers of a viscoelastic polymer to damp vibrations of component parts of a device or structure subject to temperatures of at least 50° C. The constrained-layer construction is affixed by mechanical or adhesive means to a solid article in need of vibration damping. These constructions comprise:

A. a stiff layer or substrate which is any web or sheet having a stiffness of at least 0.40 (relative to stainless steel) that causes it to resonate in response to an internal or external applied force, and B. a layer of viscoelastic polymer which is a copolymer having a storage modulus, G', above $1 \times 10^7$ dynes per square centimeter and a loss tangent, tan $\delta$, above 0.5, preferably above 0.7, at temperatures above 50° C., preferably above 100° C., and at frequencies of 1000 Hertz or less, said layer having a thickness in the range of 0.01 to 100 mm, said copolymer formed from a polymerizable mixture comprising:

1. 25 to 75% by weight of an acryloyl or methacryloyl derivative of at least one oligomer having a glass transition temperature, Tg, of less than 25° C. selected from polyoxyalkylene, poly(perfluorooxyalkylene), polyalkyleneimine, polyester, polyolefin, polyacrylate, polyamide, and polysiloxane oligomers that have one or more hydroxyl, amino, or thiol groups per oligomer and a molecular weight per oligomer of 600 to 20,000 and
2. 75 to 25% by weight of a free-radically copolymerizable monomer whose homopolymer has a Tg of 50° C. or higher.

Properties of vibration-damping materials are described in the literature. Nielsen, L. E., "Mechanical Properties of Polymers", pages 162-165, Reinhold Publishing Corp., New York, (1965) discloses that materials possessing the maximum vibration-damping capability have storage moduli, G', greater than $10^7$ dynes/cm$^2$ but less than $10^{10}$ dynes/cm$^2$ at the use temperature. Furthermore, Rosen, S. L., "Fundamental Principles of Polymeric Materials for Practicing Engineers", pages 222-227, Barnes & Noble Inc., New York, (1971), shows that it is desirable for a vibration-damping material to have both a storage modulus and a loss tangent with values as high as possible.

Yerges, L. F., "Sound, Noise, and Vibration Control", Van Nostrand Reinhold Company, New York, pages 68 and 69, (1969) notes that useful damping materials exhibit decay rates from as low as 5 to 80 dB/sec (decibels/second), and from ½ to 20 percent of critical damping. ("Critical" damping is the damping necessary to just prevent oscillation).

As is known in the art, the most efficient use of the damping material occurs if the material is sandwiched between the panel to be damped and a relatively stiff layer, such as thin sheet metal. This forces the damping material into shear as the panel vibrates, dissipating substantialy more energy than when the material acts simply in extension and compression.

Solid articles comprising the viscoelastic copolymers of the invention are prepared by either of two processes. In a first process, a layer of the polymerizable mixture is coated onto a release liner, the mixture polymerized, and the layer of resulting copolymer transferred to a substrate and adhered thereto, thereby providing a constrained-layer construction. In the second process, a layer of the polymerizable mixture is coated directly onto a substrate and the mixture polymerized in situ thereby also providing a constrained-layer construction. The constrained-layer construction is then mechanically (e.g., as by bolting) or adhesively affixed to the solid article that requires vibration damping. When the solid article subsequently vibrates under the influence of an internal or external applied force, vibration in the solid article is damped.

As used in this application:

"nucleophilic group" means a group having a pair of unshared electrons such as hydroxyl, amino, and thiol groups;

"free-radical generator" means both thermally and photochemically activatable free-radical initiators and sensitizers;

"activating radiation" means electromagnetic (e.g., visible or ultraviolet) or ionizing (e.g., high energy electrons) radiation;

"storage modulus", designated by conventional as G', is a measure of the elastic stress-strain response to an applied force of a material when measured in shear; and "solid article" means a portion or the whole of a structure, e.g., it may be a thermo print head of a computer, a turbine or a guide vane of a jet engine, or a component of an engine or a transmission of an automobile or other machinery.

DETAILED DESCRIPTION OF THE INVENTION

The polymerizable mixtures suitable for preparing the thermally-resistant, viscoelastic polymers of use in vibration-damping constructions of the invention are made by mixing together 25 to 75% by weight of one or more acryloyl or methacryloyl derivatives of a nucleophilic group-substituted oligomer, wherein the nucleophilic group may be pendant or terminal but preferably is terminally substituted, that has a Tg of less than 25° C. and one to six hydroxyl, amino, or thiol groups per oligomer with a corresponding 75 to 25% by weight of one or more free-radically polymerizable monomers whose homopolymer has a Tg of at least 50° C. Optionally, other supplementary components, to be described below, can be added to the polymerizable mixture to provide additional desired characteristics.

Preferably, the acryloyl and methacryloyl derivatives of oligomers of use in the viscoelastic polymer have the formula:

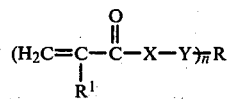    I wherein:

R is the residue of a nucleophilic group-substituted oligomer selected from polyoxyalkylene, poly(perfluorooxyalkylene), polyester, polyolefin, polyacrylate, polyamide, and polysiloxane oligomers having n hydroxyl, amino, or thiol groups and a molecular weight of 600 to 20,000;

$R^1$ is hydrogen or methyl;

n is the valence of R and an integer having a value of at least one;

Y is selected from —O—, —S—, and

in which $R^2$ is (a) hydrogen, or (b) a hydrocarbyl group selected from (1) an alkyl or cycloalkyl group having 1 to 12 carbon atoms optionally substituted by a cyano, hydroxyl, or alkoxy group having 1 to 4 carbon atoms, or (2) an aryl or aralkyl group having 6 to 12 carbon atoms;

x is any connecting group, preferably selected from a covalent bond,

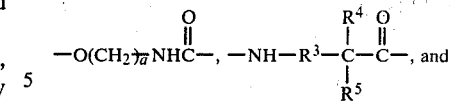

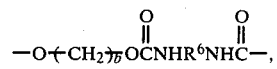

in which:

a and b independently are integers having a value of 2 to 12;

$R^3$ is a covalent bond, a methylene group, or an ethylene group, the last two of which can be substituted by an alkyl group having 1 to 6 carbon atoms or a phenyl group;

$R^4$ and $R^5$ are independently hydrogen, an alkyl group or a cycloalkyl group having 1 to 12 carbon atoms, an aryl or aralkyl group having 6 to 12 carbon atoms, or $R^4$ and $R^5$ taken together with the carbon to which they are attached form a 5- to 12-membered carbocyclic ring; and $R^6$ is an alkyl group or cycloalkyl group having 1 to 15 carbon atoms, or an aryl or aralkyl group having 6 to 15 carbon atoms;

with the proviso that when $R^2$ is a hydrocarbyl group, then at least one of $R^4$ and $R^5$ is hydrogen.

The acryloyl and methacryloyl derivatives of use in the viscoelastic polymers of the invention are prepared by the reaction of any acryloylating agent with a nucleophilic group-substituted oligomer (i.e., an organic compound having repeating units that is preferably terminally substituted by at least one nucleophilic group, i.e., an electron-rich group). Suitable nucleophilic oligomers are those having a molecular weight of 600 to 20,000 and, therefore, from about 10 to about 500 repeating units and 1 to 6 nucleophilic groups per oligomer selected from hydroxyl, amino, and thiol groups. Useful acryloylating agents are acrylic or methacrylic acid, their halides, esters or anhydrides, and preferably their isocyanatoalkyl esters, and most preferably the alkenyl azlactones. Reactions leading to the formation of these functional oligomers proceed according to the equations:

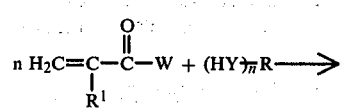    I.

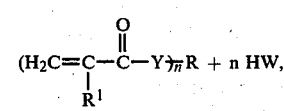

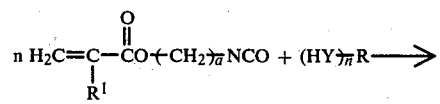    II.

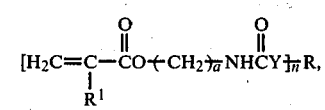

-continued

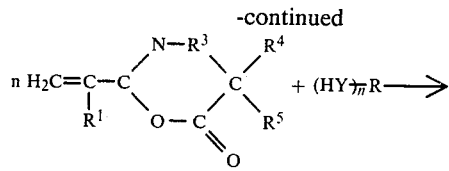

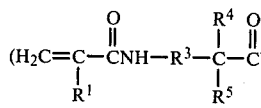

and

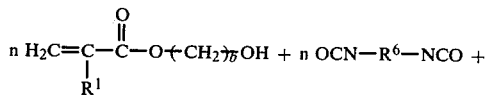

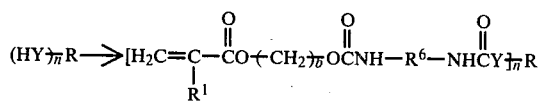

in which R, $R^1$, $R^3$, $R^4$, $R^5$, $R^6$, Y, a, b, and n are defined above, and W is halide or $OR^7$ in which $R^7$ is hydrogen, lower alkyl, phenyl, or

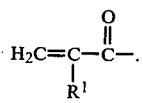

Thus, in accordance with Equation I, acrylic acid or methacrylic acid, their esters, halides, or anhydrides can be caused to react in a well-known metathetical reaction with suitable nucleophilic group-substituted oligomers, to be described below.

Preferably, because no by-products are produced by the reaction, the acryloyl and methacryloyl derivatives of use in the mixtures of the invention are prepared in accordance with the reactions of Equation II or Equation III. In accordance with Equation II, the derivatives are prepared by reaction of the nucleophilic group-substituted oligomer with an isocyanatoalkyl acrylate or methacrylate such as, for example, 2-isocyanatoethyl acrylate, 3-isocyanatopropyl acrylate, 4-isocyanatobutyl acrylate, 6-isocyanatohexyl acrylate, 12-isocyanatododecyl acrylate, and the corresponding methacrylates. In accordance with Equation III, the derivatives are prepared by reaction of the nucleophilic group-substituted oligomer and an alkenyl azlactone. The preparation of the alkenyl azlactones is discussed in assignee's U.S. Pat. No. 4,304,705, which patent is hereby incorporated herein by reference. Examples of suitable alkenyl azlactones include:

2-ethenyl-1,3-oxazolin-5-one,
2-isopropenyl-1,3-oxazolin-5-one,
2-ethenyl-4,4-dimethyl-1,3-oxazolin-5-one,
2-isopropenyl-4,4-pentamethylene-1,3-oxazolin-5-one,
2-ethenyl-5,6-dihydro-4H-1,3-oxazin-6-one,
2-isopropenyl-5,6-dihydro-5,5-dimethyl-4H-1,3-oxazin-6-one, and
2-isopropenyl-4,5,6,7-tetrahydro-6,6-dimethyl-1,3-oxazepin-7one.

Other suitable alkenyl azlactones are described in U.S. Pat. No. 4,304,705.

In addition, the acryloyl or methacryloyl derivatives of use in the mixture of the invention are prepared in a two-step sequence as illustrated by Equation IV above. In accordance with Equation IV, the nucleophilic group-substituted oligomer is first reacted with a polyisocyanate to produce an isocyanate functional oligomer having at least one -NCO group, In the second step this isocyanate functional oligomer is reacted with a hydroxyalkyl acrylate or methacrylate. This reaction, where R is polycaprolactone, is described in U.S. Pat. No. 3,700,643.

Suitable nucleophilic group-substituted oligomers which can be reacted with acryloylating reactants in accordance with Equations I, II, III, or with a polyisocyanate as in Equation IV to produce the polymerizable derivatives of use in the compositions of the invention can vary widely within the scope of the invention. Particularly useful examples include: (1) polyether polyols such as polyethyleneglycol, polypropyleneglycol and polytetramethyleneglycol, and poly(perfluoroether)diols, and the like; (2) polyester polyols such as polycaprolactone polyols, polyneopentyladipate polyols, and the like; (3) polyoxyalkylene polyamines such as the polyethylene- and polypropyleneoxide based mono- and polyamines available from Jefferson Chemical Co., Inc., a subsidiary of Texaco, Inc., under the trade name Jeffamine ®; (4) hydroxy- and amino-functional derivatives of polymerized fatty acids, more commonly referred to as "dimer" or "trimer" acid derivatives, such as those sold commercially under the trade designation Kemamine ® (Humko Sheffield Chemical); (5) hydroxy- or amino-functional olefin polymers and copolymers such as hydroxy-terminated polybutadienes and amine-terminated butadiene-acrylonitrile copolymers (B. F. Goodrich's HYCAR ® ATBN); (6) primary or secondary amino-functional polyamides such as those useful as epoxy curing agents (e.g. Emerez ® reactive polyamide resins from Emery Industries, Inc.); (7) polyethyleneimines; (8) polyvinyl alcohol and other hydrolyzed or partially hydrolyzed vinyl acetate homo- and interpolymers; and (9) polysiloxane polyols such as those described in U.S. Pat. Nos. 4,098,742; 3,886,865; 3,577,264; and 4,013,698. A particular class of materials useful for preparation of the oligomers of the present invention is a series of polyamides of polyethers of the general structure:

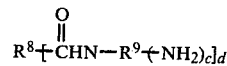

wherein $R^8$ is the residue of a mono- or poly-functional carboxylic acid having at least one carboxyl group removed therefrom, $R^9$ is a radical of a polyvalent corresponding to a polyether polyamine having a molecular weight of from about 200 to about 10,000, and c and d are independently integers from 1 to 4. These polyamines are conveniently prepared by standard condensation techniques from the appropriate organic acid (or suitable derivative) and excess polyether polyamine such as those described in U.S. Pat. Nos. 4,107,061 and 3,257,342, incorporated herein by reference.

Suitable free-radically copolymerizable comonomers for use in the polymerizable mixture suitable for preparing the viscoelastic polymers of use in the vibration-damping constructions of the invention are those whose homopolymers have a glass transition temperature of at least 50° C. The glass transition temperature of polymers is well-known in polymer chemistry [see, for example, Brandrup and Immergut, Polymer Handbook, III, pp. 61–73, Interscience Publishers (1967)]. Examples of suitable monomers (and the Tg of their homopolymers) are N-vinylpyrrolidone (86° C.), acrylic acid (87° C.), N,N-dimethylacrylamide (89° C.), styrene (100° C.), methyl methacrylate (105° C.), isobornyl acrylate (94° C.), 2-chlorostyrene (119° C.), acrylamide, acrylonitrile (120° C.), methacrylonitrile (120° C.), and dichlorostyrene (133° C.). As described above, the total polymerizable mixture contains at least 25 percent by weight of monomer whose homopolymer has a Tg of at least 50° C., at least 25 percent by weight of the total polymerizable mixture of an acryloyl or methacryloyl derivative of a suitable nucleophilic oligomer, and up to 50 percent by weight of a diluting free-radically polymerizable monomer whose Tg is less than 50° C. Included among such diluting monomers (and the Tg of their homopolymer) are 2-(N-butylcarbamyl)ethyl methacrylate (31° C.), butyl methacrylate (20° C.), methyl acrylate (6° C.), ethyl acrylate (−24° C.), and butyl acrylate (−55° C.).

It is sometimes desirable to add to the polymerizable mixtures up to about 5 percent by weight of a multiacrylate-functional monomer to enhance the crosslink density of the polymerized mixture. By doing so, viscoelastic polymers, which at a desired temperature and frequency have inadequate storage moduli and/or loss tangents, can be upgraded to polymers having storage moduli and loss tangents that are in the desired range. Suitable multiacrylate-functional monomers include ethylene diacrylate, trimethylolpropane triacrylate, methylenebis-(acrylamide), hexanediol diacrylate, divinylbenzene, pentaerythritol tri- and tetraacrylate, 1,3,5-tri(2-methacryloxyethyl)-s-triazine, and the like.

The polymerizable mixtures of use in the invention also may contain up to about ten percent by weight of the mixture of additives (i.e., fillers, reinforcing agents, antioxidants, etc.) normally added to vibration-damping materials. Suitable fillers include ground mica, limestone, stone dust, sand, clay, chopped fiberglass, pigments, and the like. Particularly desirable fillers are the fumed silicas such as Cab-O-sil ® M5, available from Cabot Corporation, that are excellent thickening agents which facilitate the coating operation and improve the substantivity of the coating composition to some substrates. It is also often desirable to include within the polymer layer a skrim of thermally-resistant fibers such as fibers of polyester, glass fibers, and particularly, ceramic microfibers.

The viscoelastic polymers of use in the present invention and laminates containing these polymers are prepared according to the steps of either Mehtod I or Method II.

Method I:
1. coating a release liner with a layer of the polymerizable mixture of the invention,
2. polymerizing the mixture to a viscoelastic polymer layer,
3. transferring the viscoelastic polymer layer from the release liner to a substrate, and
4. adhering the viscoelastic polymer layer to the substrate to form the constrained-layer vibration-damping construction; or Method II:
1. coating a substrate with a layer of the polymerizable mixture, and
2. polymerizing the mixture to a viscoelastic polymer layer in situ onto the substrate to form the constrained-layer vibration-damping construction.

In both of the above-described processes, it is preferable to add to the polymerizable mixture a free-radical initiator (0.01 to 5 weight percent) to promote polymerization. Suitable free-radical initiators which may be added to produce thermally curable coating mixtures include azo compounds such as azobis(iso-butyronitrile), hydroperoxides such as tert-butyl hydroperoxide, peroxides such as benzoyl peroxide or cyclohexanone peroxide, and also include redox catalysts such as the persulfate/bisulfite pair, peroxide/tertiary amine combinations, or other redox couples capable of initiating free-radical polymerizations. Generally, from about 0.01 to 5 percent by weight of thermally activatable initiator based on total polymerizable mixture is used.

While it is within the scope of this invention to utilize thermally polymerizable mixtures as described above, an additional aspect, which in many instances becomes a preferred embodiment, of the invention is with mixtures that are polymerizable by activating radiation. An excellent discussion of different forms of activating radiation can be found in W. J. Moores's text entitled "Physical Chemistry", 3rd Edition, p. 819, Prentice Hall (1964). When the source of activating radiation is electromagnetic, a sensitizer or photoinitiator is preferably added to the mixture. Any of the common sensitizers or photoinitiators may be utilized such as benzophenone, benzophenone/amine combinations, benzoin, benzoin ethers and their derivatives such as the dimethyl ketal of benzil. Additional listings of sensitizers and photoinitiators which are useful in the invention may be found in J. F. Rabek, *Photochemistry and Photobiology*, 7, 5 (1968) and in G. Oster and N. Yang, *Chem. Rev.*, 68, 125 (1968). These sensitizers are generally incorporated at about 0.01 to 5.0 percent by weight, although higher levels may be utilized.

Since the viscoelastic polymer generally has adhesive properties, the polymer can usually be adhered to a stiff layer or substrate without the use of an adhesive. It is sometimes desirable, however, to use a thin layer (e.g., 20–50 μm) of high-modulus adhesive, such as an acrylic adhesive or an epox adhesive, to bond the polymer to a solid article which can be, for example, an oil pan, a valve cover, or a transmission housing.

For most applications, the layer of viscoelastic polymer is a coating having a thickness of at least 0.01 mm up to about 100 mm, preferably 0.025 to 100 mm, and most preferably 0.05 to 100 mm. the coating can be applied by any of the techniques known in te art such as by spray, dip, knife, or curtain coating.

As mentioned above, a stiff layer or substrate is an essential part of the constrained-layer vibration-damping constructions of the present invention. A suitable material for a substrate has a stiffness of 0.40 (relative to stainless steel) as defined in "Handbook of tables for Applied Engineering Science", ed. Bolz, R. E. et al., CRC Press, Cleveland, Ohio, page 130 (1974). The desired stiffness of the substrate is varied by adjusting the thickness of the layer, for example from about 25 micrometers to 5 centimeters, depending on the modulus of the substrate. Examples of suitable materials include metals such as iron, steel, nickel, aluminum, chromium, cobalt and copper, and alloys thereof and stiff polymeric materials such as polystyrene, polyvinylchloride, polyurethane, polycarbonate, and polyepoxide, glass fiber-reinforced plastics such as glass fiber, ceramic fiber, and metal fiber-reinforced polyester, glasses, and ceramics.

To be satisfactory as a high temperature-resistant vibration-damping material for applications in the automotive, aerospace, and computer industries, a polymer must possess a loss tangent, tan δ, above 0.5, preferably above 0.7, and a storage modulus above $1 \times 10^7$ dynes/cm$^2$, and preferably between $1 \times 10^7$ and $5 \times 10^8$ dynes/cm$^2$ or higher at temperatures above 50° C., preferably above 75° C., and most preferable in the range of 100°–150° C., and stability against change of these characteristics following exposure of the polymer to air at 100° C. for at least 1000 hours. Procedures for determining the loss tangent and storage modulus of materials are well known in polymer physics and are discribed, for example, by Miles, *J. Appl. Phys.*, 33 (4), 1422–1428 (1962). Measurements reported herein were made using a Dynamic Shear Rheometer, Model CSR-1, from Melabs of Palo Alto, Calif., that had been modified to ensure parallel alignment of the driver and pickup piezoelectric transducers. Stress on the sample and phase shift were read directly using state of the art amplifiers and a phase network analyzer to monitor the output electrical signal.

Objects and advantages of this invention are further illustrated by the following examples, but the particular materials and amounts thereof recited in these examples, as well as other conditions and details, should not be construed to unduly limit this invention.

Acryloyl or methacryloyl derivatives of nucleophilic group-substituted oligomers were prepared as follows:

Preparation A

A round-bottomed flask equipped with a mechanical stirrer and a dropping funnel was charged with 250 g Jeffamine ® D-2000 (0.24 equivalents of polyoxypropylenediamine, having an equivalent weight of 1041.7), and cooled in a cold water (10°–15° C.) bath. The contents of the flask were rapidly stirred and 33.4 g 2-ethenyl-4,4-dimethyl-1,3-oxazolin-5-one (0.24 mole) was added in a stream. Stirring was continued 15 minutes, then the cold water bath was removed. After stirring an additional two hours at room temperature, analysis of the reaction mixture by infrared spectroscopy indicated complete disappearance of the azlactone carbonyl absorption and the 2-acrylamido-2,2-di-methylacylated oligomer had been formed. The acryloylated oligomer obtained, having the approximate formula

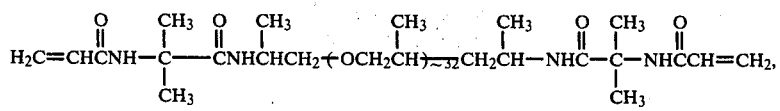

had a Brookfield viscosity (21° C.) of 96 poises. It was designated VDM-D2000.

Preparation B

In a manner similar to that of Preparation A, an acryloylated oligomer was prepared using, in place of Jeffamine D-2000, an equivalent amount of Jeffamine ® ED-900 (122.4 g of a polyoxyethylenediamine having a molecular weight of 1020 and the approximate formula

where e + f is about 3. The acryloylated oligomer obtained was designated VDM-ED900.

Preparation C

In a manner similar to that of Preparation A, a methacryloylated oligomer was prepared using, in place of Jeffamine D-2000, an equivalent amount of Carbowax ® 1450 (174 g of a polyoxyethylenediol having a molecular weight of 1450, Union Carbide) and, instead of 2-ethenyl-4,4-dimethyl-1,3-oxazolin-5-one, an equivalent amount of 2-isocyanatoethyl methacrylate (38 g). The methacryloylated oligomer obtained was designated IEM-CW1450.

Preparation D

Preparation C was repeated using, in place of Carbowax 1450, an equivalent amount of PCP-0240 (240 g of a polycaprolactonediol having a molecular weight of 2000, Union Carbide). The methacryloylated oligomer obtained was designated IEM-PCP2000.

Preparation E

A round-bottom, 3-necked flask equipped with a stirrer, thermometer, dropping funnel, and reflux condenser with apparatus for azeotropic removal of water was charged with 333.3 g (0.33 mole) of Carbowax ® 1000 (a polyethylenediol having a molecular weight of 1000, Union Carbide), 0.024 g (60 ppm) of phenothiazine (as polymerization inhibitor), 100 ml of toluene, 100 ml of heptane, and 6.0 g methanesulfonic acid (as esterification catalyst). The mixture was heated to reflux and 63.3 g (0.73 mole) methacrylic acid was added at a rate such that foaming was avoided. Reflux was continued while removing water from the system for 20 hours, reflux temperature rising from 91° to 110° C. The reaction mixture was cooled, diluted with 400 ml toluene and 200 ml of heptane, washed with 200 of water, stirred with 60 g magnesium hydroxide and dried over 60 g of alumina. Volatiles were than removed and the dimethacryloylated polyoxyalkylenediol was obtained as a waxy solid designated MA-CW1000.

EXAMPLES 1–14

Mixtures of acryloylated or methacryloylated oligomer and various ratios of monomer having a glass transition temperature of at least 50° C. [designated monomer (Tg) greater than 50° C.] were mixed and 0.25% by weight of Irgacure ® 651 (benzil dimethyl ketal, Ciba-Geigy Corp.) were added.

A sufficient amount of each mixture was placed into an aluminum tray having an area of about 20 cm$^2$ to provide a layer of 2.5 mm ± 0.1 mm thickness. Each tray was placed into a chamber under a Sylvania Blacklight F15T8-BLB (an ultraviolet emitting lamp, Sylvania, Inc., division of GTE Corp.) at a distance of 10 cm. The air was displaced from the chamber with nitrogen and the contents of each tray were irradiated for ten minutes. For each mixture, a tough, tear-resistant, flexible, generally almost colorless sheet of viscoelastic polymer was obtained. The storage modulus and loss tangent of the polymers were determined and the results are presented in Table I below.

TABLE I

| | | Initial Storage Modulus (G') and Loss Tangent (δ) Data | | | | | |
|---|---|---|---|---|---|---|---|
| | Acrylated or | | | | | Polymer | |
| Ex. | Methacrylated | | | | Additive | Characteristics | |
| No. | Oligomer | (Parts) | "Monomer"[a] | (Parts) | (%) | G' × 10[7][d] | Tanδ[e] |
| 1 | VDM-ED900 | (1) | AA | (1) | — | 4.08 | 1.26 |
| 2 | VDM-ED900 | (1) | NVP | (1) | — | 2.30 | 0.759 |
| 3 | VDM-D2000 | (1) | MM | (2) | — | 3.53 | 0.883 |
| 4 | VDM-D2000 | (1) | NVP | (2) | — | 2.45 | 0.292 |
| 5 | VDM-D2000 | (1) | AA | (1) | — | 28.0 | 0.554 |
| 6 | VDM-D2000 | (1) | AA | (1) | TMPA[b] (1) | 5.68 | 1.09 |
| 7 | VDM-D2000 | (1) | AA | (1) | TMPA (5) | 26.0 | 0.625 |
| 8 | VDM-D2000 | (3) | AA | (1) | — | 4.61 | 0.615 |
| 9 | VDM-D2000 | (1) | DMA | (2) | SiO$_2$[c] (8) | 5.47 | 0.83 |
| 10 | VDM-D2000 | (1) | DMA | (2) | SiO$_2$ (6) | 9.0 | 0.9 |
| 11 | IEM-CW1450 | (1) | DMA | (2) | — | 3.54 | 1.32 |
| 12 | IEM-PCP2000 | (1) | DMA | (2) | — | 8.74 | 1.35 |
| 13 | MA-CW1000 | (1) | DMA | (2) | — | 2.28 | 1.20 |
| 14 | MA-CW1000 | (1) | DMA | (3) | — | 16.2 | 1.45 |

[a]Monomer having a Tg of greater than 50° C.;
AA acrylic acid
NVP N—vinylpyrrolidone
MM methylmethacrylate
DMA N,N—dimethylacrylamide
[b]TMPA trimethylolpropane triacrylate
[c]SiO$_2$ fumed silica (Cab-O-Sil M-5)
[d]G' storage modulus in dynes/cm$^2$ measured at 100° C. and 1000 Hz
[e]Tanδ loss tangent

EXAMPLES 15-18

Selected viscoelastic polymers were subjected to heat aging at 100° C. in air for 1000 hours, after which the storage modulus and loss tangent were redetermined. The data are presented in TABLE II below.

TABLE II

| | Storage Modulus (G') and Loss Tangent (δ) Data After Heat Aging | | |
|---|---|---|---|
| | Composition | Polymer Characteristics | |
| Ex. No. | of Example | G'* | Tanδ |
| 15 | 1 | 1.19 | 1.695 |
| 16 | 2 | 4.23 | 0.857 |
| 17 | 3 | 3.31 | 1.253 |
| 18 | 6 | 15.1 | 0.839 |

*G' storage modulus in dynes/cm$^2$ × 10$^{-7}$ measured at 100° C. and 1000 Hz

The data in Tables I and II show that mixtures of an acryloylated or methacryloylated oligomer and methyl methacrylate or dimethylacrylamide provide viscoelastic polymer having excellent characteristics for damping vibration at elevated temperatures.

Various modifications and alterations of this invention will become apparent to those skilled in the art without departing from the scope and spirit of this invention, and it should be understood that this invention is not be be unduly limited to the illustrative embodiments set forth herein.

We claim:

1. A constrained-layer construction for damping vibrations in solid articles at a temperature of at least 50° C., said construction comprising a substrate having a stiffness relative to stainles steel of at least 0.40 and bearing a continuous layer of a copolymer having a thickness of 0.01 mm to 100 mm, said copolymer having a storage modulus of at least $1 \times 10^7$ dynes/cm$^2$ and a loss tangent above 0.5 at 100° C. and 1000 Hz, said copolymer being the reaction product of a mixture comprising:

(a) 25 to 75 weight percent of an acryloyl or methacryloyl derivative of at least one oligomer, said oligomer having a glass transition temperature of less than 25° C. and a molecular weight per oligomer of 600 to 20,000, said oligomer having the formula

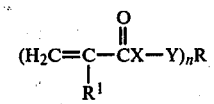

$$(H_2C{=}C{-}CX{-}Y)_nR$$
         $|$
         $R^1$ wherein:

R is the organic residue of a nucleophilic group-substituted oligomer having a molecular weight of 600 to 20,000, glass transition temperature of less than 25° C., and n hydroxyl, amino or thiol groups, said nucleophilic group-substituted oligomer being selected from the group consisting of polyoxyalkylene, poly(perfluorooxyalkylene), polyester, polyolefin, polyacrylate, polyamide, and polysiloxane oligomers;

n is the valence of R having a value of at least one;

Y is selected from —O—, —S— and

$$-\underset{\underset{R^2}{|}}{N}-$$

in which R$^2$ is (a) hydrogen, or (b) a hydrocarbyl group selected from (1) an alkyl or cycloalkyl group having 1 to 12 carbon atoms optionally substituted by cyano, hydrogen or alkoxy group having 1 to 4 carbon atoms, or (2) an aryl or aralkyl group having 6 to 12 carbon atoms;

X is a divalent connecting group; and

R$^1$ is hydrogen or methyl; and (b) 75 to 25 weight percent of a copolymerizable monomer whose homopolymer has a glass transition temperature of at least 50° C.

2. A process for damping the vibration of a vibrating solid article at temperatures above 50° C., said process comprising the steps:
(a) providing a constrained-layer construction, said construction comprising at least one substrate having a stiffness relative to stainles steel of at least 0.40 coated with at least one continuous layer of a viscoelastic copolymer having a thickness of 0.01 mm to 100 mm, said copolymer having a storage modulus of at least $1 \times 10^7$ dynes/cm$^2$ and a loss tangent above 0.5 to 100° C. and 1000 Hz, said copolymer being the reaction product of a mixture comprising:
(1) 25 to 75 percent of an acryloylated or methacryloylated oligomer having a glass transition temperature of less than 25° C. and a molecular weight of 600 to 20,000, said oligomer having the formula

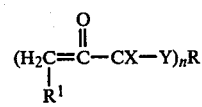

wherein:
R is the organic residue of a nucelophilic group-substituted oligomer having a molecular weight of 600 to 20,000, glass transition temperature of less than 25° C., and n hydroxyl, amino or thiol groups, said nucleophilic group-substituted oligomer being selected from the group consisting of polyoxyalkylene, poly(perfluorooxyalkylene), polyester, polyolefin, polyacrylate, polyamide, and polysiloxane oligomers;
n is the valence of R having a value of at least one;
Y is selected from —O—, —S— and

in which R$^2$ is (a) hydrogen, or (b) a hydrocarbyl group selected from (1) an alkyl or cycloalkyl group having 1 to 12 carbon atoms optionally substituted by cyano, hydrogen or alkoxy group having 1 to 4 carbon atoms, or (2) an aryl or aralkyl group having 6 to 12 carbon atoms;
X is a divalent connecting group; and
R$^1$ is hydrogen or methyl; and (2) 75 to 25 percent by weight of a copolymerizable monomer whose homopolymer has a glass transition temperature of at least 50° C., and
(3) an effective amount of a free-radical generator, and
(b) affixing said constrained-layer construction onto said solid article.

3. The process according to claim 2 wherein said divalent connecting group, X, is selected from the group consisting of a covalent bond,

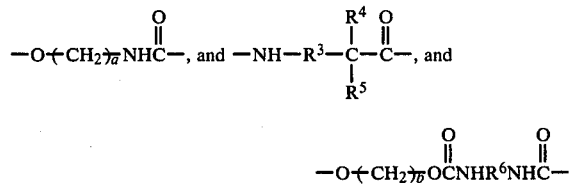

wherein:
a and b independently are integers having a value of 2 to 12;
R$^3$ is a covalent bond, a methylene group, an ethylene group, the last two of which can be substituted by an alkyl group having 1 to 6 carbon atoms or a phenyl group;
R$^4$ and R$^5$ are independently hydrogen, an alkyl group of a cycloalkyl group having 1 to 12 carbon atoms, an aryl or aralkyl group having 6 to 12 carbon atoms, or R$^4$ and R$^5$ taken together with the carbon to which they are attached from a 5- to 12-membered carbocyclic ring; and R$^6$ is an alkyl group or cycloalkyl group having 1 to 15 carbon atoms, or an aryl or aralkyl group having 6 to 15 carbon atoms;
with the proviso that when R$^2$ is a hydrocarbyl group, then at least one of R$^4$ and R$^5$ is hydrogen.

4. The process according to claim 2 wherein said oligomer has the formula

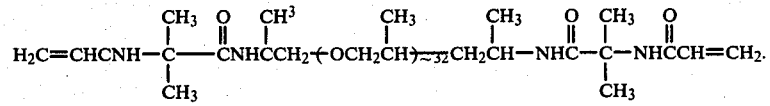

5. The process according to claim 2 wherein said copolymerizable monomer is selected from the group consisting of methyl methacrylate and N,N-dimethylacrylamide.

6. The process according to claim 2 further comprising up to 50 percent by weight of a diluting free-radically polymerizable monomer having a Tg less than 50° C.

7. The process of claim 2 further comprising 0.01 to 5 weight percent of a free-radical generator.

8. The process according to claim 2 wherein said substrate is selected from the group consisting of metals, stiff polymeric materials, glass fiber-reinforced plastics, ceramic fiber, glass, ceramics, and metal fiber-reinforced polyester.

* * * * *